US010720168B2

(12) United States Patent
Burtea

(10) Patent No.: US 10,720,168 B2
(45) Date of Patent: Jul. 21, 2020

(54) PPS TAGGING OF ACOUSTIC SAMPLE DATA

(71) Applicant: Mueller International, LLC, Atlanta, GA (US)

(72) Inventor: Valentin Mircea Burtea, Toronto (CA)

(73) Assignee: Mueller International, LLC, Atlanta, GA (US)

( * ) Notice: Subject to any disclaimer, the term of this patent is extended or adjusted under 35 U.S.C. 154(b) by 530 days.

(21) Appl. No.: 14/811,866

(22) Filed: Jul. 29, 2015

(65) Prior Publication Data

US 2017/0032795 A1 Feb. 2, 2017

(51) Int. Cl.
*G10L 19/008* (2013.01)
*G01M 3/24* (2006.01)
*G10L 19/018* (2013.01)
*H04Q 9/04* (2006.01)

(52) U.S. Cl.
CPC ........... *G10L 19/018* (2013.01); *G01M 3/243* (2013.01); *G10L 19/008* (2013.01); *H04Q 9/04* (2013.01)

(58) Field of Classification Search
None
See application file for complete search history.

(56) References Cited

U.S. PATENT DOCUMENTS 6,791,311 B2 * 9/2004 Murphy ............. G01R 29/0842
324/72
7,607,351 B2 * 10/2009 Allison .................. F16L 55/00
702/36
2002/0124633 A1 * 9/2002 Yang ..................... G01M 3/243
73/40.5 R
2014/0121999 A1 5/2014 Bracken et al.
2014/0165731 A1 * 6/2014 Linford ................. G01M 3/243
73/592

(Continued)

FOREIGN PATENT DOCUMENTS

CN 103234121 8/2013
WO 2017019678 2/2017

OTHER PUBLICATIONS

M. Siccardi, M. Abgrall†, G. D. Rovera†,About time measurements, 2012, IEEE (Year: 2012).*

(Continued)

*Primary Examiner* — Matthew G Marini
(74) *Attorney, Agent, or Firm* — Taylor English Duma LLP

(57) ABSTRACT

Technologies are described herein for time-synchronizing sample data from independent recording devices utilizing samples tagged from a highly accurate time source. Datasets comprising samples representing a signal over a period of time are received from separate recording devices. A number of samples in each dataset are tagged indicating that the sample was taken immediately after a pulse in a PPS signal from a highly accurate time source onboard the recording device. The indices of the PPS-tagged samples, along with corresponding time values, are extracted from the datasets, and a set of common time values between the datasets is determined. A pair of frames of a specific length are extracted from each dataset aligned on the PPS-tagged samples corresponding to the common time values and comparative analysis is performed on the pair of frames.

20 Claims, 7 Drawing Sheets

(56) References Cited

U.S. PATENT DOCUMENTS

| | | | | |
|---|---|---|---|---|
| 2015/0276539 A1* | 10/2015 | Hoshuyama | ............... | F17D 5/06 |
| | | | | 73/49.1 |
| 2015/0281809 A1* | 10/2015 | Foster, III | ................ | H04Q 9/04 |
| | | | | 340/870.26 |
| 2015/0308627 A1* | 10/2015 | Hoskins | .................... | E03B 7/00 |
| | | | | 702/45 |
| 2015/0350752 A1* | 12/2015 | Solomon | .................. | H04Q 9/04 |
| | | | | 340/870.01 |

OTHER PUBLICATIONS

Burtea, Valentin Mircea; International Search Report and Written Opinion for serial No. PCT/US2016/044028, filed Jul. 26, 2016, dated Oct. 6, 2016, 8 pgs.

Burtea, Valentin Mircea; International Preliminary Report on Patentability for PCT Application No. PCT/US2016/044028, filed Jul. 26, 2016, dated Feb. 8, 2018, 7 pgs.

Burtea, Valentin Mircea; Extended European Search Report for serial No. 16831233.8, filed Jul. 26, 2016, dated Feb. 13, 2019, 9 pgs.

* cited by examiner ically remote locations may be utilized by a leak detection or condition assessment system to detect leaks and/or determine the integrity of the pipe wall. In order to improve the effectiveness of coherent sound detection, the acoustic data from the recording devices at the remote locations should be time-synchronized. Time synchronization also improves the accuracy of time, velocity, and location estimates. However, since separate recording devices with independent and imprecise clocks may be utilized, variations in timing and actual sampling frequencies may reduce synchronicity of the sampling and the accuracy of the analysis. In addition, these variations grow more significant as the sample size of the recordings grows.

It is with respect to these and other considerations that the disclosure made herein is presented.

PPS TAGGING OF ACOUSTIC SAMPLE DATA

BACKGROUND

Acoustic data recorded at two or more geograph-

BRIEF SUMMARY

The present disclosure relates to technologies for time-synchronizing sample data captured by independent recording devices. The proposed method uses a highly accurate time source to tag corresponding synchronous samples on all devices. According to some embodiments, a method of time-synchronizing signal data from independent recording devices for comparative analysis comprises receiving a first dataset and a second dataset from separate recording devices, each dataset comprising a plurality of samples representing a signal over a period of time. A number of samples from each dataset are tagged, indicating that the sample was taken immediately after a time reference pulse generated by a highly accurate time source onboard the recording device, such as a pulse-per-second ("PPS") signal from an onboard GPS receiver. The indices of the PPS-tagged samples, along with corresponding time values, are extracted from the first dataset and the second dataset, and a common time value between the first dataset and the second dataset is determined along with the indices of the corresponding PPS-tagged samples. A pair of frames of a specific length are extracted from the first dataset and the second dataset aligned on the PPS-tagged samples corresponding to the common time value and comparative analysis is performed on the pair of frames.

According to further embodiments, a system comprises a plurality of recording devices and an analysis computer. Each recording device comprises an internal clock, a processor, a memory, an analog-to-digital converter (ADC), and a communication modem and is connected to a sensor and a highly accurate time source. Digital samples of a signal received from the sensor are digitized by the ADC and recorded. Samples occurring immediately following a pulse in a PPS signal received from the highly accurate time source are tagged as PPS-tagged samples. The samples are collected into a dataset along with time values corresponding to the PPS-tagged samples. The dataset is transmitted to the analysis computer, which comprises at least one processor operably connected to a memory, the memory containing a comparative processing module configured to receive a first dataset from a first of the plurality of recording devices and a second dataset from a second of the plurality recording devices. A common time value between the first dataset and the second dataset is determined along with indices of the corresponding PPS-tagged samples within the dataset. Frames of a specific length are extracted from each dataset aligned on the PPS-tagged samples corresponding to the common time value, and comparative analysis between the frames is performed.

According to further embodiments, a computer-readable storage medium comprises processor-executable instructions that, when executed by a processor in a first recording device, cause the processor to sample an acoustic signal received from a sensor for a configured amount of time and at a configured sampling frequency. The processor further tags samples occurring immediately following a pulse in a PPS signal received from a highly accurate time source as PPS-tagged samples. The samples are collected into a first dataset along with time values corresponding to the PPS-tagged samples, and the first dataset is transmitted to an analysis computer. The analysis computer is configured to time-synchronize the samples in the first dataset with samples in a second dataset received from a second recording device by determining common time values between the first and second datasets and extracting frames of data aligned on the corresponding PPS-tagged samples from the first and second datasets for comparative analysis.

These and other features and aspects of the various embodiments will become apparent upon reading the following Detailed Description and reviewing the accompanying drawings.

BRIEF DESCRIPTION OF THE DRAWINGS

In the following Detailed Description, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1:
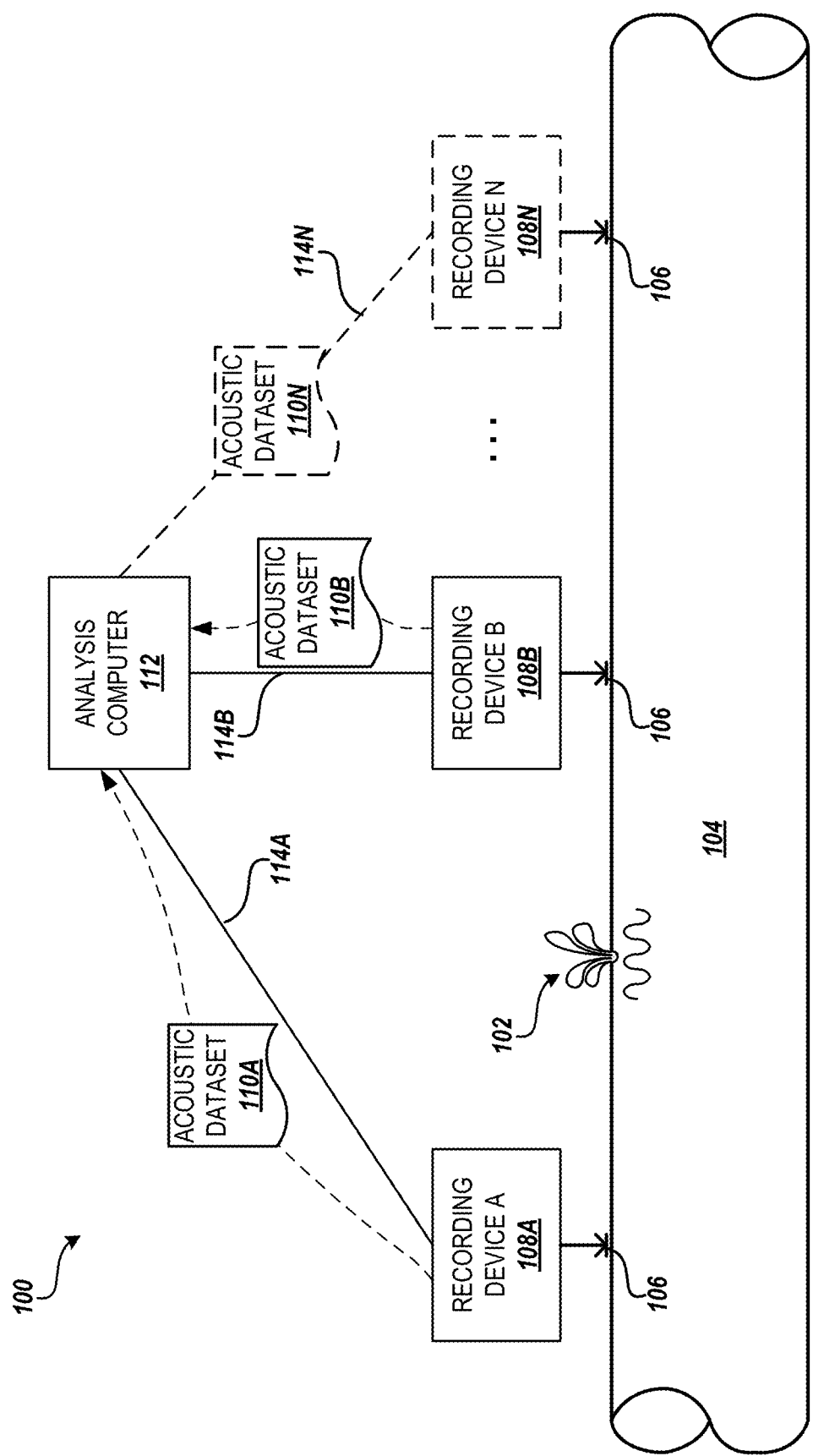
FIG. 1 is a block diagram showing one example of a system for leak detection utilizing the embodiments described herein.

The following detailed description is directed to technologies for time-synchronizing sample data from independent recording devices utilizing samples tagged from a highly accurate time source. Using the technologies described herein, acoustic data or other datasets recorded by two or more devices having independent, unsynchronized clocks can be time-synchronized before comparative analysis, such as signal correlation. This time-synchronization of the datasets may improve the effectiveness and accuracy of comparative analysis of the data, such as that performed for leak detection and/or condition assessment in fluid distribution systems, for example.

As discussed above, when acoustic data from two separate recording devices with independent and imprecise clocks is compared for analysis, variations in timing and actual sampling frequency may reduce synchronicity of the sampling and therefore accuracy of analysis. For example, signal correlation between the acoustic datasets may be affected by the sampling frequency offset between the two signals. Further, the correlation amplitude may decrease as the frequency offset gets larger and/or as the sample size increases.

In the ideal case of comparing acoustic data representing a single sound source recorded at two remote locations at identical sampling rates, the coherent energy will accumulate, while the noise components will present a random phase and will cancel out. For a long sample size, the processing gain will emphasize the coherent signal potentially generated by the sound source. In the case of different sampling frequencies, however, only a partial accumulation will occur as the phase is different between the two signals. The higher the sampling frequency offset, the higher the phase shift, resulting in lower coherent amplitude. For large sample sizes, the phase-shift may become larger than $2\pi$ and the two signals and the correlation will be destructed. If datasets are limited in length in order to reduce the effects of the sampling frequency offset, however, there may be insufficient gain to discriminate the source information from the background noise in the acoustic signal(s).

According to embodiments described herein, each individual recording device utilizes a highly accurate time source to embed synchronization data into the datasets. In some embodiments, the recording devices may utilize a pulse-per-second ("PPS") signal received from a GPS receiver onboard the device. The PPS signal is an extremely accurate signal from the GPS receiver based on the atomic clocks in the satellites that has an accuracy ranging from 12 picoseconds to a few microseconds per second. Each sample in the dataset may be tagged with a type of "1" to indicate a normal sample or a type of "2" to indicate that the sample was taken immediately after the rising edge of a pulse in the PPS signal from the GPS receiver. Samples tagged with a type of "2" are also referred to herein as "PPS-tagged samples." For example, if the recording device collects data at a sampling frequency of 8 kHz over 12 seconds (by the onboard clock), there may be 11, 12 or 13 PPS-tagged samples in the data.

When the datasets are received from the recording devices at a processor for analysis, the samples may be divided into frames of specific sample lengths, e.g., 1, 2, 4, etc. seconds, with the frames aligned based on acoustic samples tagged as type "2" corresponding to the same GPS time. Because the frames are aligned on the tagged samples, the effects of any frequency offset in the sampling rates between the two signals are minimized. The result is highly synchronized acoustic data from the two recording devices for correlation analysis. By tagging the acoustic data based on the PPS signal, the acoustic signals from different recording devices can be synchronized without requiring synchronized clocks on each device, e.g. having the clock signal of the device controlled in a phase lock loop with the GPS. This reduces the expense of the recording devices as well as the amount of battery power needed to record the acoustic data.

FIG. 1 is a block diagram showing one example of a system 100 for leak detection in a water transmission system utilizing the embodiments described herein. The system 100 may be implemented by a utility provider, for example. A leak 102 in a distribution pipe 104 may produce an acoustic signal in the pipe. The acoustic signal may be detected by sensors 106, such as acoustic transducers, located at multiple remote locations along the pipe 104. The sensors 106 may be external to the pipe 104, embedded in the pipe wall, located within the flow of water or other fluid in the pipe, or any combination of these. Each sensor 106 may be connected to a remote recording device 108A-108N (referred to herein generally as recording device 108). According to embodiments, each recording device 108 may further operate using an independent, internal clock.

Each recording device 108 may be configured to wake at same time of day and record any acoustic signal detected by the connected sensor 106. The recording devices 108 may be furthered configured to record acoustic data at a specific sampling frequency and sample size. For example, the recording devices 108 may be configured to record 12 seconds of acoustic data from the connected sensor(s) 106 at a sampling frequency of 8 kHz. The acoustic data may be compressed or uncompressed. The recorded acoustic dataset 110A-110N (referred to herein generally as acoustic dataset 110) from each recording device 108 may be then be transmitted to an analysis computer 112 for analysis in order to detect any leak signals as well as determine the nature and/or location of any leak 102 detected in the pipe 104. The recorded acoustic datasets 110A-110N may be transmitted by the recording devices 108A-108N to the analysis computer 112 over various communication link 114A-114N (referred to herein generally as communication links 114).

The communication links 114 may include radio frequency ("RF") communication links, cellular data links, Wi-Fi or WiMAX network links, satellite communication links, metropolitan-area networks ("MANs"), wide-area networks ("WANs"), the Internet, and the like. In some embodiments, the recording devices 108 and the communication links 114 may be configured in a peer-to-peer or "mesh" networking topology comprising nodes, data collection hubs, repeaters, gateways, and the like. The system 100 may also include other infrastructure communication, monitoring and control devices (not shown) implemented in the mesh network, such as valves, sensors, control panels, and the like.

The analysis computer 112 may comprise a centrally located host computing system, a portable computing device utilized in the field, a node or collection hub within a mesh network with the recording devices 108, or the like. According to some embodiments, the analysis computer 112 may perform comparative analysis on pairs of received acoustic datasets 110 in order to detect leaks 102 in the pipe 104 and/or determine the nature and location of the detected leak(s). For example, the analysis computer 112 may perform a signal correlation between the acoustic waveforms represented by the acoustic dataset 110A from recording device 108A and the acoustic dataset 110B from recording device 108B to detect any leaks and/or determine the location of the leak 102. However, since each recording device 108 operates using independent and potentially unsynchronized clocks, the respective acoustic datasets 110 may be unsynchronized. For example, even though the acoustic dataset 110A and acoustic dataset 110B may contain a same number of samples (the configured sample size), the recordings may start at slightly different times and may be sampled at slightly different sampling frequencies. As discussed above, these variations may cause inaccuracies in the comparative analysis. In addition, as the sample size increases, these variations become more and more significant in the analysis.

Figure 2:
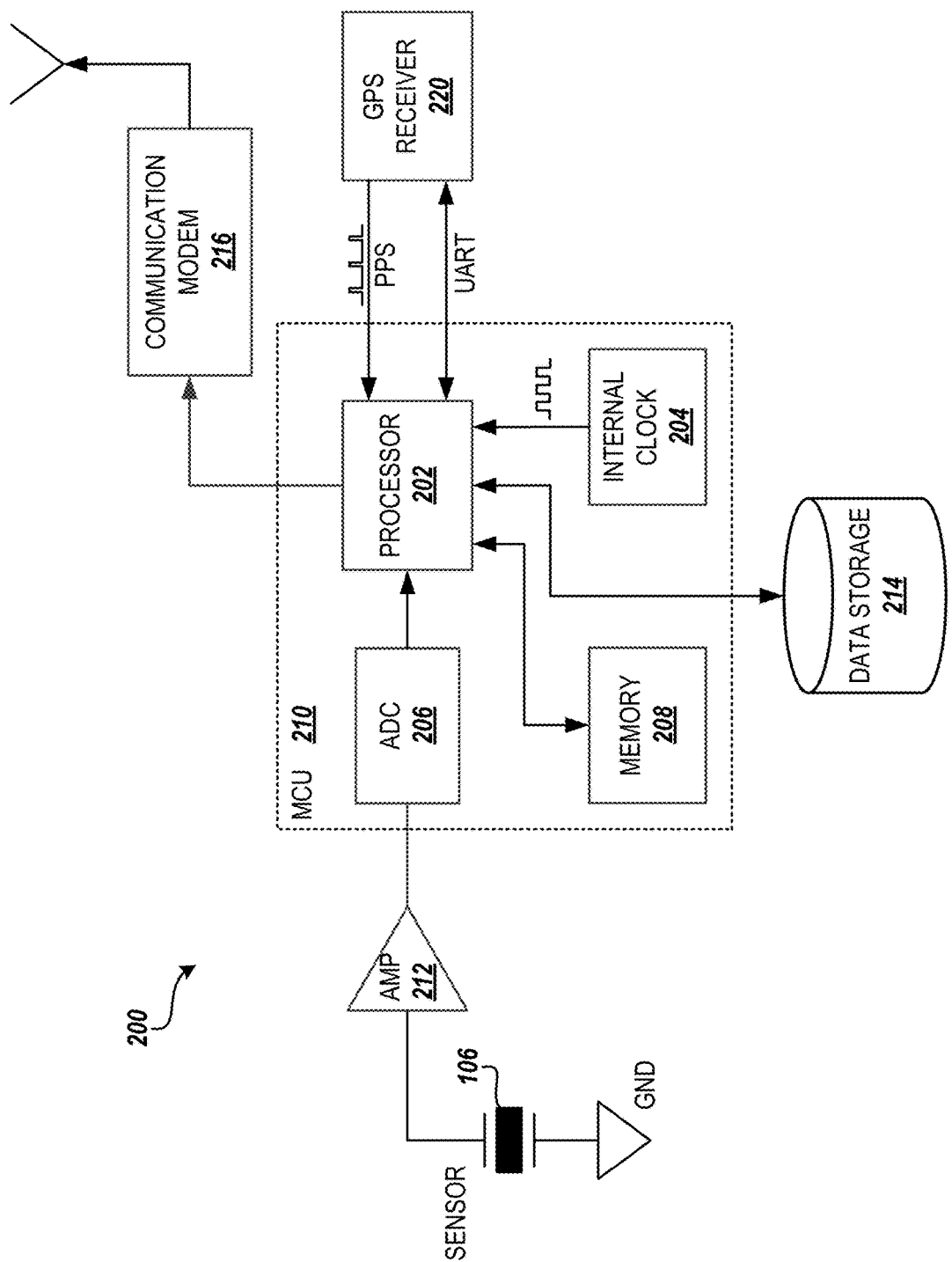
FIG. 2 is a block diagram of component architecture of a recording device capable of recording samples and tagging samples based on a highly accurate time source, according to embodiments described herein.

FIG. 2 shows a block diagram of an architecture 200 for an illustrative recording device 108, according to some embodiments. The architecture 200 includes a processor 202, an internal clock 204, an analog-to-digital converter ("ADC") 206 and a memory 208. The processor 202 may be a general-purpose microprocessor, a field-programmable gate array ("FPGA"), or the like. Timing for operation of the processor 202 and other components on the recording device is provided by the internal clock 204. The ADC 206 allows the processor 202 to digitally sample a signal from the sensor 106 during the recording process to produce the acoustic dataset 110. The sensor 106 may be connected to the ADC 206 via an amplifier 212 and/or other components, such as filters and the like.

The memory 208 may comprise a computer-readable storage medium for storing processor-executable instructions, data structures and other information. The memory 208 may include a non-volatile memory, such as read-only memory ("ROM") and/or FLASH memory, and a random-access memory ("RAM"), such as dynamic random access memory ("DRAM") or synchronous dynamic random access memory ("SDRAM"). The memory 208 may store a firmware that comprises commands and data necessary for the recording device 108 to periodically record the acoustic data from the sensor 106 and transmit the acoustic dataset 110 to the analysis computer 112. The memory 208 may further store the acoustic dataset 110 during the recording process before transmission to the analysis computer 112. According to some embodiments, the processor 202, internal clock 204, ADC 206, and/or memory 208 may be packaged as modules of a microcontroller unit ("MCU") 210.

In addition to the memory 208, the recording device 108 may have access to external data storage 214 for storing program modules, data structures, and other data described herein for time-synchronizing sample data from independent recording devices utilizing samples tagged from a highly accurate time source. For example, the data storage 214 may store the acoustic dataset 110 during the recording process before transmission to the analysis computer 112. It will be appreciated by those skilled in the art that the data storage 214 may comprise any computer-readable media that may be accessed by the processor 202 or other computing system, including volatile and non-volatile, removable and non-removable storage media implemented in any method or technology for the non-transitory storage of information. For example, computer-readable media includes, but is not limited to, RAM, ROM, erasable programmable ROM ("EPROM"), electrically-erasable programmable ROM ("EEPROM"), FLASH memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices and the like.

The architecture 200 further includes a communication modem 216 utilized by the processor 202 to transmit the acoustic dataset 110 to the analysis computer 112 over the communication link(s) 114. According to some embodiments, the communication modem 216 is configured to communicate wirelessly with the analysis computer 112 and/or interim communication nodes in one or more network topologies, including mesh networking, point-to-point, point-to-multipoint, star, and the like.

According to some embodiments, the architecture 200 further includes a global position satellite ("GPS") receiver 220. The GPS receiver 220 may be configured to receive timing signals from multiple GPS satellites, determine a location for the recording device 108 from the timing signals, and provided the location and timing information to the processor 202. The GPS receiver 220 may communicate with the processor 202 via a universal asynchronous receiver/transmitter ("UART") to provide the timing and location information to the processor in an asynchronous fashion.

In addition, the GPS receiver 220 may supply a pulse-per-second ("PPS") signal to the processor 202. As described above, the PPS signal is an extremely accurate timing signal from the GPS receiver 220 with an accuracy ranging from 12 picoseconds to a few microseconds per second. According to embodiments, the rising edge of the PPS signal corresponds to the precise time corresponding to the next time value received asynchronously from the GPS receiver 220 following the pulse. In other embodiments, the recording device 108 may receive timing information and/or a PPS signal from other types of precision timing devices, including radio beacons, atomic clocks, and the like. In a preferred embodiment, the precision timing device will have a time accuracy of 1 ms or better.

According to embodiments, the processor 202 uses the PPS signal and the timing information received from the GPS receiver 220 or other connected precision timing device to embed synchronization data into the acoustic dataset 110. In some embodiments, the acoustic dataset 110 comprising the samples from the recording may comprise a header followed by the sample data, as illustrated below in Table 1 below.

TABLE 1

Layout of Acoustic Data

| Offset (bytes) | Size (bytes) | Name | Description |
| --- | --- | --- | --- |
| 0 | 4 | detectorId | ID of the recording device. |
| 4 | 4 | utcTime | UTC time in seconds at payload creation. |
| 8 | 2 | utcMs | Milliseconds within the UTC second at payload creation. |
| 10 | 1 | flags | Flags as defined by the protocol |
| 11 | 1 | type | Payload data type (e.g. acoustic capture) |
| 12 | 4 | healthFlags | Health flags at payload creation |
| 16 | 2 | battery | Battery level of the recording device upon payload creation. |
| 18 | 2 | spareData | Reserved for future use. |
| 20 | 4 | sampleSize | Number of payload bytes that follow this header. |
| 24 | sampleSize | data | The records (samples) of the payload. |

The records of the payload may comprise the samples of the dataset. Each record may comprise a 4-byte (32-bit) value. The most significant byte ("MSB") of the 32-bit value may indicate the type of record, as detailed in Table 2 below.

TABLE 2

Record Types

| MSB Value | Sample Type |
|---|---|
| 1 | Regular sample record: 24-bit signed data |
| 2 | PPS sample record: 24-bit signed data (a PPS pulse occurred before this sample) |
| >80 | Time record (a GPS time value corresponding to the last PPS) |

Records of type "1" may indicate a normal sample record (e.g. the three remaining bytes representing a 24-bit signed value containing the sample). Records of type "2" may indicate the record contain a 24-bit sample value taken immediately after a pulse in the PPS signal from the GPS receiver 220, i.e., the first sample taken following the rising-edge of the pulse. For example, if the recording device 108 collects data at a sampling frequency of 8192 Hz over 12 seconds (by the onboard clock), there may be 11, 12, or 13 records of type "2" in the acoustic dataset 110. It will be appreciated that the actual sampling frequency of the acoustic dataset 110 may vary due to variation of the oscillator in the internal clock.

In further embodiments, records having a MSB value greater than 80 contain a 32-bit time value received from the onboard GPS receiver 220. The time value arrives at the processor 202 asynchronously sometime after the corresponding PPS pulse. Accordingly, the PPS pulse marks precisely the time, while the corresponding time value is revealed by the subsequent "time" record. It will be further appreciated that only a PPS pulse followed by a time record within the next 1 sec (8192 samples in the above example) may be considered valid. According to some embodiments, only these PPS-tagged records are used for time synchronization purposes, as will be described below. The time records and sample records may be interleaved in the acoustic dataset 110 in the sequence that they occurred.

It will be appreciated that the structure and/or functionality of the recording device 108 may be different than that of the architecture 200 illustrated in FIG. 2 and described herein. For example, the processor 202, internal clock 204, ADC 206, memory 208, communication modem 216, GPS receiver 220, and other components and circuitry of the recording device may be integrated within a common integrated circuit package or distributed among multiple integrated circuit packages. Similarly, the illustrated connection pathways are provided for purposes of illustration and not of limitation, and some components and/or interconnections may be omitted for purposes of clarity. It will be further appreciated that the recording device 108 may not include all of the components shown in FIG. 2, may include other components that are not explicitly shown in FIG. 2 or may utilize an architecture completely different than that shown in FIG. 2.

Figure 3:
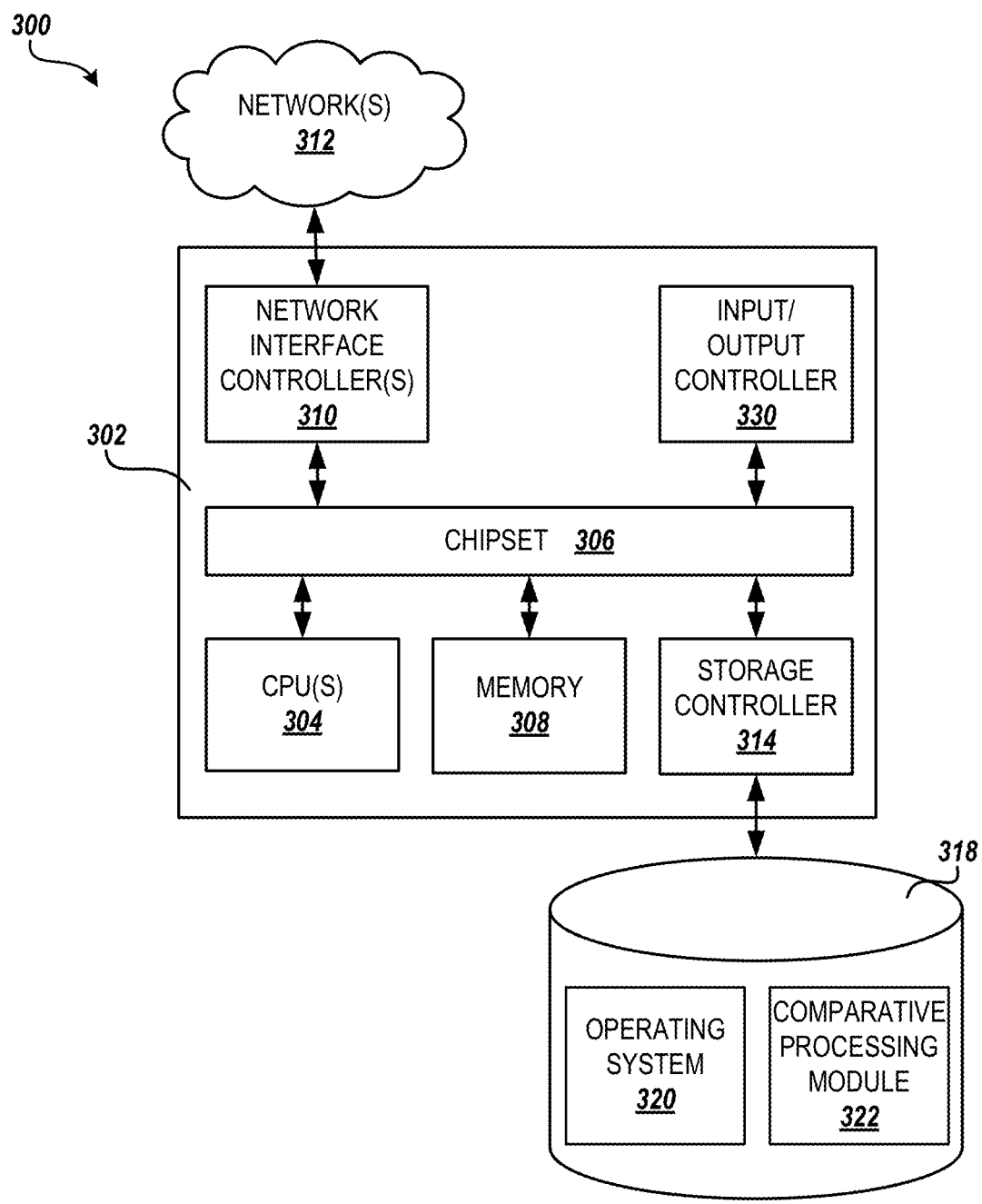
FIG. 3 is a block diagram showing an example of a computer architecture capable of executing the software components described herein for time-synchronizing sample data from independent recording devices utilizing samples tagged from a highly accurate time source, according to embodiments described herein.

FIG. 3 shows an example computer architecture 300 for a computer 302 capable of executing software components described herein for time-synchronizing sample data from independent recording devices utilizing samples tagged from a highly accurate time source. The computer architecture 300 shown in FIG. 3 illustrates a conventional server computer, workstation, desktop computer, laptop, or other computing device, and may be utilized to execute any aspects of the software components presented herein described as executing on the analysis computer 112 or other computing platform. The computer 302 may include a baseboard, or "motherboard," which is a printed circuit board to which a multitude of components or devices may be connected by way of a system bus or other electrical communication paths. In one illustrative embodiment, one or more central processing units ("CPUs") 304 operate in conjunction with a chipset 306. The CPUs 304 are standard programmable processors that perform arithmetic and logical operations necessary for the operation of the computer 302.

The CPUs 304 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 306 provides an interface between the CPUs 304 and the remainder of the components and devices on the baseboard. The chipset 306 may provide an interface to a memory 308. The memory 308 may include a random access memory ("RAM") used as the main memory in the computer 302. The memory 308 may further include a computer-readable storage medium such as a read-only memory ("ROM") or non-volatile RAM ("NVRAM") for storing basic routines that that help to startup the computer 302 and to transfer information between the various components and devices. The ROM or NVRAM may also store other software components necessary for the operation of the computer 302 in accordance with the embodiments described herein.

According to various embodiments, the computer 302 may operate in a networked environment using logical connections to remote computing devices through one or more networks 312, such as the wireless mesh network described herein, a local-area network ("LAN"), a wide-area network ("WAN"), the Internet, or any other networking topology known in the art that connects the computer 302 to the recording devices 108 and other remote computers. The chipset 306 may include functionality for providing network connectivity through one or more network interface controllers ("NICs") 310, such as a gigabit Ethernet adapter. It should be appreciated that any number of NICs 310 may be present in the computer 302, connecting the computer to other types of networks and remote computer systems beyond those described herein.

The computer 302 may be connected to a mass storage device 318 that provides non-volatile storage for the computer. The mass storage device 318 may store system programs, application programs, other program modules, and data, which are described in greater detail herein. The mass storage device 318 may be connected to the computer 302 through a storage controller 314 connected to the chipset 306. The mass storage device 318 may consist of one or more physical storage units. The storage controller 314 may interface with the physical storage units through a serial attached SCSI ("SAS") interface, a serial advanced technology attachment ("SATA") interface, a fiber channel ("FC") interface, or other standard interface for physically connecting and transferring data between computers and physical storage devices.

The computer 302 may store data on the mass storage device 318 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 318 is characterized as primary or secondary storage, or the like. For example, the computer 302 may store information to the mass storage device 318 by issuing instructions through the storage controller 314 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 302 may further read information from the mass storage device 318 by detecting the physical states or characteristics of one or more particular locations within the physical storage units.

The mass storage device 318 may store an operating system 320 utilized to control the operation of the computer 302. According to some embodiments, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized. The mass storage device 318 may store other system or application programs and data utilized by the computer 302, such as a comparative processing module 322 utilized by the computer to time-synchronizing sample data from independent recording devices utilizing samples tagged from a highly accurate time source, as described herein.

In some embodiments, the mass storage device 318 may be encoded with computer-executable instructions that, when loaded into the computer 302, may transform the computer from a general-purpose computing system into a special-purpose computer capable of implementing the embodiments described herein. These computer-executable instructions transform the computer 302 by specifying how the CPUs 304 transition between states, as described above. According to some embodiments, the mass storage device 318 may store computer-executable instructions that, when executed by the computer 302, perform the routine 600 for time-synchronizing sample data from independent recording devices utilizing samples tagged from a highly accurate time source, as described below in regard to FIG. 6. In further embodiments, the computer 302 may have access to other computer-readable storage medium in addition to or as an alternative to the mass storage device 318.

The computer 302 may also include an input/output controller 330 for receiving and processing input from a number of input devices, such as a keyboard, a mouse, a touchpad, a touch screen, an electronic stylus, or other type of input device. Similarly, the input/output controller 330 may provide output to a display device, such as a computer monitor, a flat-panel display, a digital projector, a printer, a plotter, or other type of output device. It will be appreciated that the computer 302 may not include all of the components shown in FIG. 3, may include other components that are not explicitly shown in FIG. 3, or may utilize an architecture completely different than that shown in FIG. 3.

Figure 4:
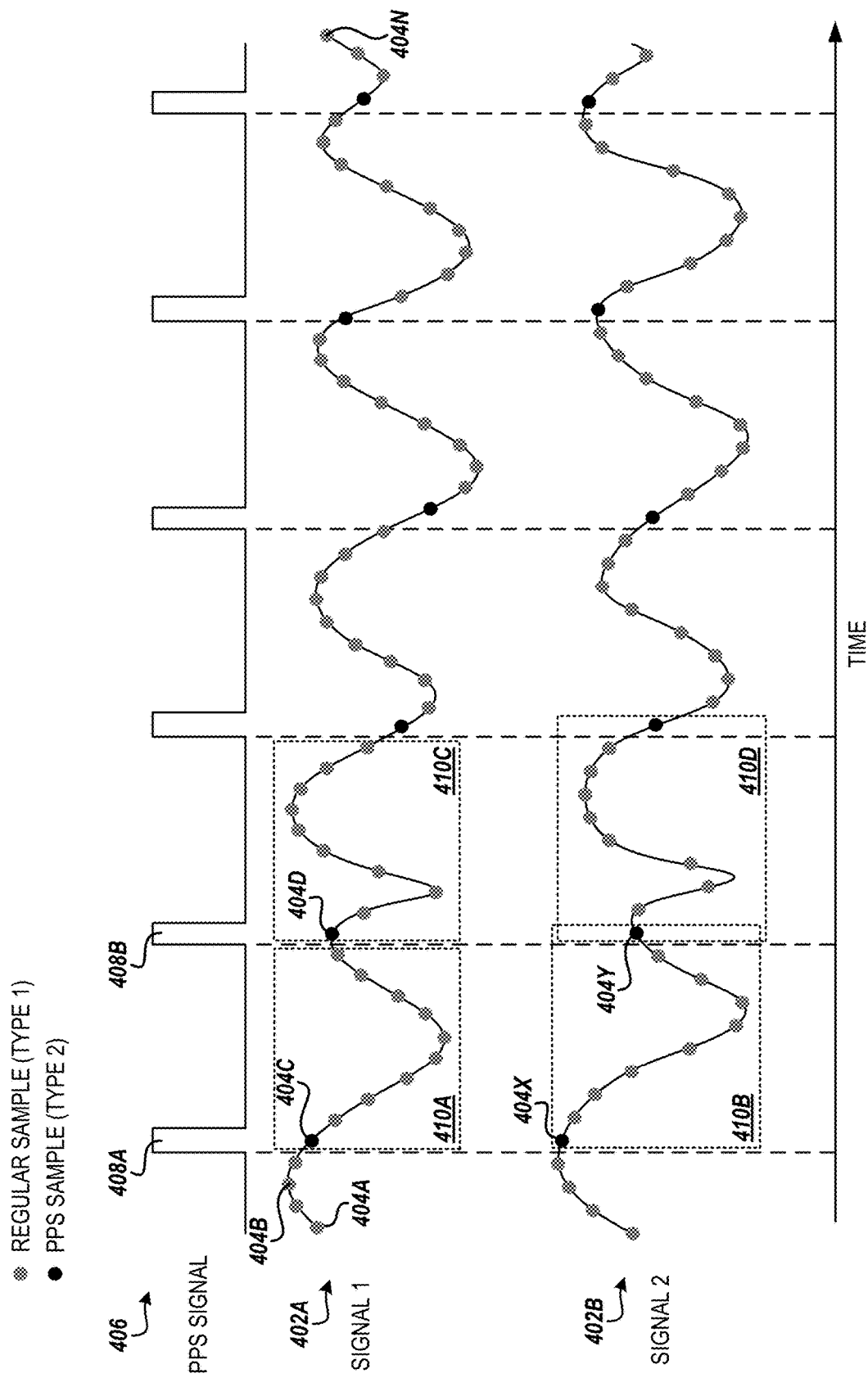
FIG. 4 is a chart illustrating additional details of methods for tagging samples from a highly accurate time source, according to embodiments described herein.

FIG. 4 provides additional details regarding the methods described herein for time-synchronizing sample data from independent recording devices utilizing samples tagged from a highly accurate time source. Specifically, FIG. 4 shows timing diagram containing two signals 402A and 402B from two, independent recording devices 108A and 108B. The signals 402A and 402B may represent acoustic signals detected in a pipe wall by sensors 106 of the respective recording devices 108A and 108B, for example. The recording device 108A may be configured to wake at a particular time and utilize the onboard ADC 206 to digitize the signal 402A at a set sampling frequency and generate acoustic dataset 110A comprising samples 404A-404N (referred to herein generally as sample 404) to be transmitted to the analysis computer 112. The recording device 108B may also be configured to perform the same recording process at the same time utilizing the same sampling frequency.

However, variations in the internal clocks 204 of the respective recording devices 108A and 108B may result in the signals being recorded at slightly different times and slightly different sampling frequencies. FIG. 4 also shows a PPS signal 406 generated by the GPS receiver 220 onboard each of the recording devices 108A and 108B. As described above, the rising edge of the pulses, such as pulses 408A and 408B, in the respective PPS signals 406 of the recording devices 108A and 108B will be synchronized within several microseconds of each other. As further described above, the recording devices 108A and 108B may utilize the PPS signal 402 from the onboard GPS receiver 220 to tag the samples 404 in the acoustic datasets 110A, 110B as type 1—regular sample, such as samples 404A or 404B, or type 2—PPS samples, such as samples 404C or 404D. The acoustic datasets 110A and 110B may further include time records corresponding to the PPS-tagged samples.

Once the acoustic datasets 110A and 110B are received from the respective recording devices 108A and 108B at the analysis computer 112, a comparative processing module 322 or other software program may utilize the tagging of the samples 404 contained therein to synchronize the data to perform comparative analysis between the signals 402A, 402B, such as signal correlation. In some embodiments, the comparative processing module 322 may divide the samples in the acoustic datasets 110 into frames of specific sample lengths, e.g., 1, 2, 4, etc. seconds based on the configured sampling frequency, with the frames aligned on the PPS-tagged samples according to the corresponding time records.

For example, a configured sampling frequency of 10 Hz may yield approximately 10 samples 404 per second, as shown in FIG. 4. The comparative processing module 322 may divide the samples 404 in the acoustic datasets 110A and 110B into frames 410A-410D (referred to herein generally as frame 410) of length 10 samples (approximately 1 second) for comparative analysis. Each pair of frames, such as frames 410A and 410B, are aligned on corresponding PPS-tagged samples 404C and 404X. Similarly, frames 410C and 410D are aligned on corresponding PPS-tagged samples 404D and 404Y. It will be appreciated that, while a pair of frames may be of the same sample length, the actual time represented by the frame may vary due to variations in the onboard internal clocks 204 of the respective recording devices 108A and 108B, as further shown in frames 410A and 410B depicted in FIG. 4.

Figure 5A:
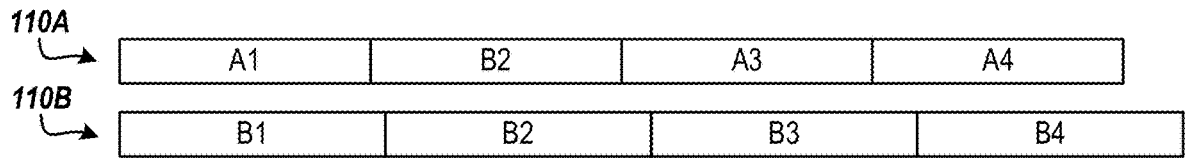
FIGS. 5A-5C are block diagrams illustrating additional details of methods for time-synchronizing sample data from independent recording devices utilizing tagged samples, according to embodiments described herein.
Figure 5B:
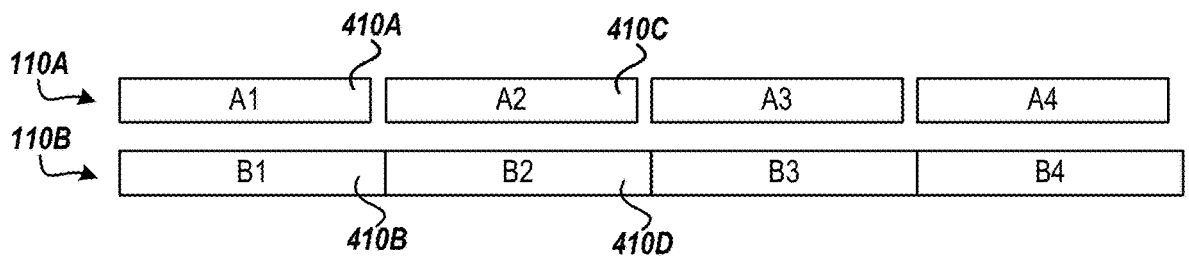

FIG. 5A shows acoustic datasets 110A and 110B comprising approximately four seconds worth of samples at a configured sampling frequency, e.g. 32,768 samples at 8192 Hz, divided into lengths of approximately one second based on PPS-tagged samples 404 in the data. As may be seen in the figure, small variations in the sampling frequencies between two recording devices 108A and 108B may lead to substantial overall differences in larger sample sizes, affecting accuracy of the comparative analysis. As shown in FIG. 5B, by dividing the acoustic datasets 110A and 110B into frames 410A-410D of a specific length, e.g., 8192 samples or approximately one second, and aligning the frames on corresponding PPS-tagged samples, such as samples 404C and 404X or samples 404D and 404Y, the effects of sampling frequency offset between two different recording devices 108A and 108B can be minimized.

Figure 5C:
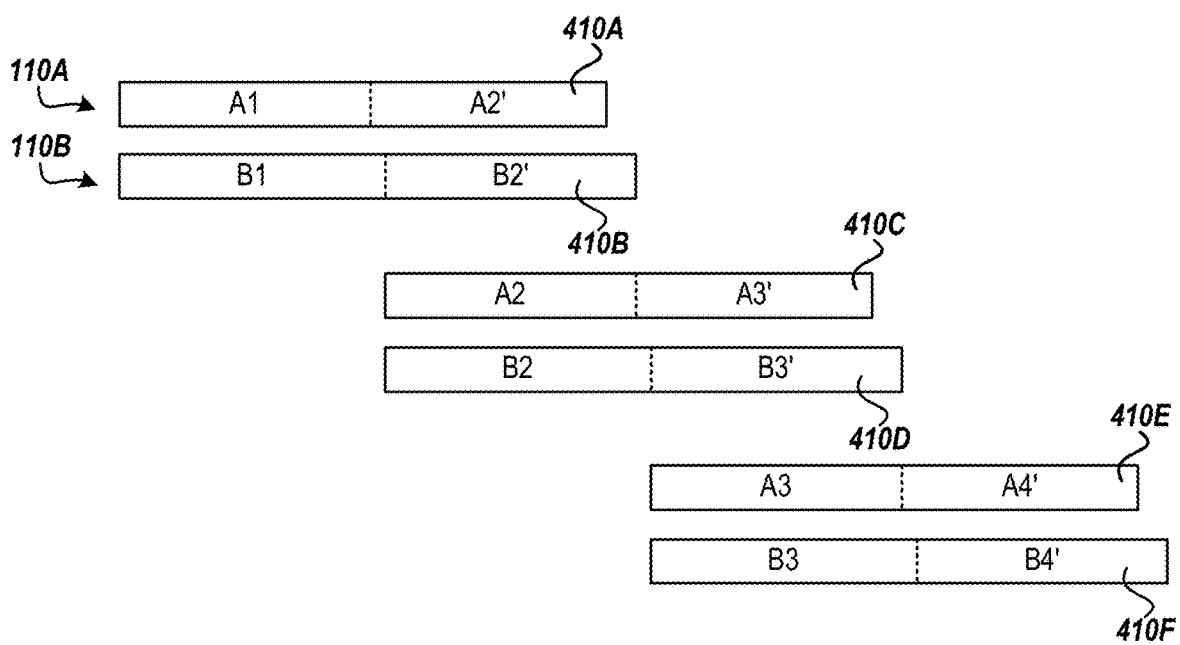

As shown in FIG. 5C, frames sizes of greater than one second worth of samples may also be utilized, according to further embodiments. For example, frames 410A and 410B of 16,384 samples (approximately two seconds) may be taken from corresponding PPS-tagged samples, such as samples 404C and 404X, for comparative analysis. The comparative processing module 322 may then skip from second to second as marked by corresponding PPS-tagged samples, such as samples 404C and 404X or samples 404D and 404Y, in the acoustic datasets 110 to perform analysis on pairs of equal length, synchronized frames. It will be appreciated that due to variations in the actual sampling frequency of the respective recording devices 108A, 108B, some samples 404 in the acoustic datasets 110 may fall within two or more frames 410, while other samples may not fall within any frames in the analysis.

According to some embodiments, for leak detection correlation algorithms, the effects of sampling frequency offset on the correlation between synchronized frames 410 of acoustic data within the spectrum of frequencies of concern is very small. The result is highly synchronized acoustic data from the two recording devices 108A and 108B for correlation processing for detection of a leak. Regardless of the sample length of the acoustic datasets 110 (4 seconds, 8 seconds, etc.) the variations from sampling frequency offset in the synchronized signals will never accumulate over more than 1 second worth of samples.

Figure 6:
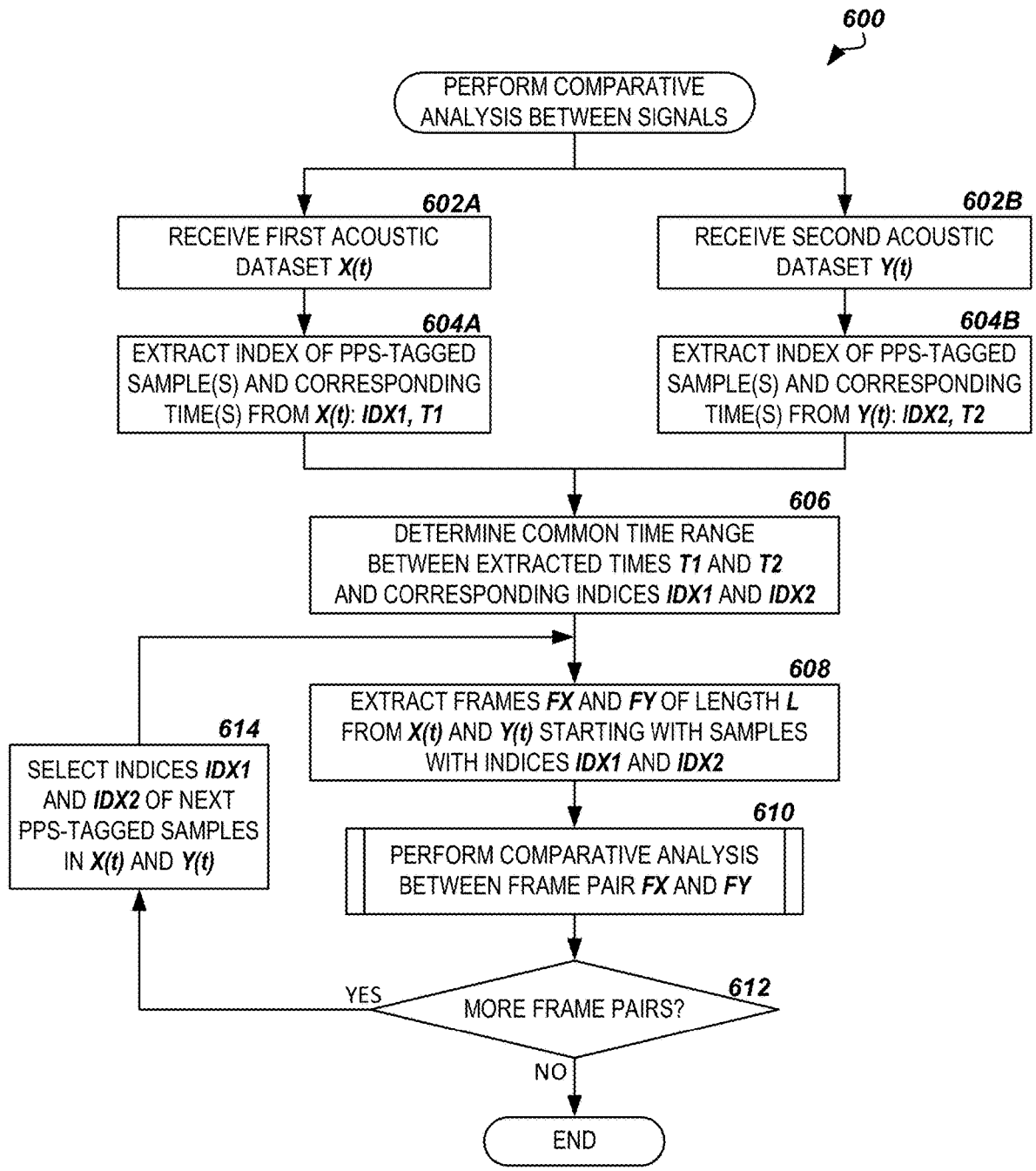
FIG. 6 is a flow diagram showing one routine for time-synchronizing two independent datasets for comparative analysis, according to embodiments described herein.

FIG. 6 is a flow diagram showing one method for time-synchronizing sample data from independent recording devices utilizing samples tagged from a highly accurate time source, according to some embodiments. Specifically, FIG. 6 illustrates one routine 600 for performing comparative analysis between two signals 402A and 402B received from independent recording devices 108A and 108B by first time-synchronizing the received acoustic datasets 110A and 110B utilizing the technologies and methods described herein. According to some embodiments, the routine 600 may be performed by a comparative processing module 322 or other software component running on the analysis computer 112. The comparative processing module 322 may be a component of a leak detection system implemented on the analysis computer 112 for a utility provider, for example. In other embodiments, the routine 600 may be performed by any combination of recording devices 108, analysis computers 112, and/or any other computing platforms known in the art.

The routine 600 begins at steps 602A and 602B, where the acoustic datasets 110A and 110B are received from the recording devices 108A and 108B, respectively. As described above, each recording device 108A, 108B may be configured to wake up at a particular time and perform a specific length recording of acoustic data at a configured sampling frequency. According to embodiments, each recording device 108 is further configured to perform the PPS-tagging of samples from a highly accurate time source, such as a GPS receiver 220, as described above in regard to FIG. 2. The recorded acoustic datasets 110A, 110B are subsequently transmitted to the analysis computer 112 over the respective communication links 114A, 114B.

It will be appreciated that the acoustic datasets 110A and 110B may be received by the analysis computer 112 and pre-processed by the comparative processing module 322 at different times, depending on the requirements and capabilities of the system. It will be further appreciated that any number of acoustic datasets 110 may be received from any number of recording devices 108 for comparative analysis, beyond the two acoustic datasets described herein. According to some embodiments, the structure of the acoustic datasets 110 may be similar to that described in regard to Tables 1 and 2 above.

Next at steps 604A and 604B, the comparative processing module 322 pre-processes each acoustic dataset 110 received. According to some embodiments, pre-processing of an acoustic dataset 110 may include extracting an index for each PPS-tagged sample record (type 2) in the data along with an associated GPS time value corresponding to the PPS-tagged sample. The index of each PPS-tagged sample record and the corresponding time values may be stored along with the acoustic datasets 110 for subsequent comparative analysis by the comparative processing module 322. Pre-processing of the acoustic dataset 110 may also include identifying those PPS-tagged sample records in the data where no subsequent time record with a corresponding time value occurs in the data within 1 second, i.e. before the next PPS-tagged sample record. According to some embodiments, these PPS-tagged sample records may not be used for time synchronization purposes.

Once the acoustic datasets 110A and 110B have been received by the analysis computer 112 and/or pre-processed by the comparative processing modules 322, the routine may proceed to step 606, where the comparative processing module 322 determines a minimum common time between the GPS time values extracted from the acoustic datasets 110A and 110B. Because the recording of acoustic data may not begin precisely at the same time due to clock drift between the internal clocks 204 of the independent recording devices 108A and 108B, the comparative processing module 322 identifies a minimum common time identified in the respective acoustic datasets 110A and 110B from which to begin the comparative analysis. In addition, the comparative processing module 322 retrieves the index of the PPS-tagged sample records within the acoustic datasets 110A and 110B corresponding to the minimum, common time value. For example, the comparative processing module 322 may identify the index of sample 404C in the acoustic dataset 110A and the index of sample 404X in the acoustic dataset 110B, both corresponding to the same pulse 408A in the PPS signal of the onboard GPS receivers 220.

The routine 600 proceeds from step 606 to step 608, where the comparative processing module 322 extracts frames 410 of length L from the acoustic datasets 110A and 110B starting from the index within the respective datasets of the PPS-tagged sample records corresponding to the minimum, common time value. For example, the comparative processing module 322 may extract frames 410A and 410B of length L=10 samples (approx. 1 second at sampling frequency of 10 Hz) from the acoustic datasets 110A and 110B starting at samples 404C and 404X, respectively, as shown in FIG. 4. In other embodiments, length L may represent approximately 1, 2, 4, etc. seconds worth of samples at the configured sampling frequency, e.g. L=32,768 samples for approximately 4 seconds at 8192 Hz sampling frequency.

From step 608, the routine 600 proceeds to step 610, where the comparative processing module 322 performs comparative analysis between the pair of frames 410A and 410B extracted from the respective acoustic datasets 110A and 110B. The routine 600 then proceeds to step 612, where the comparative processing module 322 determines if more frame pairs exist for comparative analysis. If more frame pairs exist, the routine 600 proceeds to step 614, where the comparative processing module selects the indices of the next PPS-tagged sample records within the acoustic datasets 110A and 110B. For example, the comparative processing module 322 may identify the index of sample 404D in the acoustic dataset 110A and the index of sample 404Y in the acoustic dataset 110B, both corresponding to pulse 408B in the PPS signal of the onboard GPS receivers 220.

From step 614, the routine 600 returns to step 610, where the comparative processing module 322 extracts the next pair of frames 410 of length L starting from the indices of the next PPS-tagged samples 404 from the acoustic datasets 110A and 110B for comparative analysis. For example, the comparative processing module 322 may extract frames 410C and 410D of length L=10 samples, as further shown in FIG. 4. Thus the routine 600 proceeds in an iterative fashion, skipping from second to second as marked by the PPS-tagged samples 404 to generate pairs of equal length synchronized frames 410 and perform the desired analysis. For example, to perform leak detection, the comparative processing module 322 may calculate spectrum and coherence for every pair of frames 410A and 410B, 410C and 410D, 410E and 410F, etc. as shown in FIGS. 5A-5C. The comparative processing module 322 may further calculate an average spectral coherence across sequences of frames from the respective acoustic datasets 110A and 110B for comparison. In addition, the comparative processing module 322 may calculate a correlation between pairs of frames 410A and 410B, etc. in order to perform leak detection and/or location determination. Once all pairs of frames 410 have been processed, the routine 600 ends.

Figure 7:
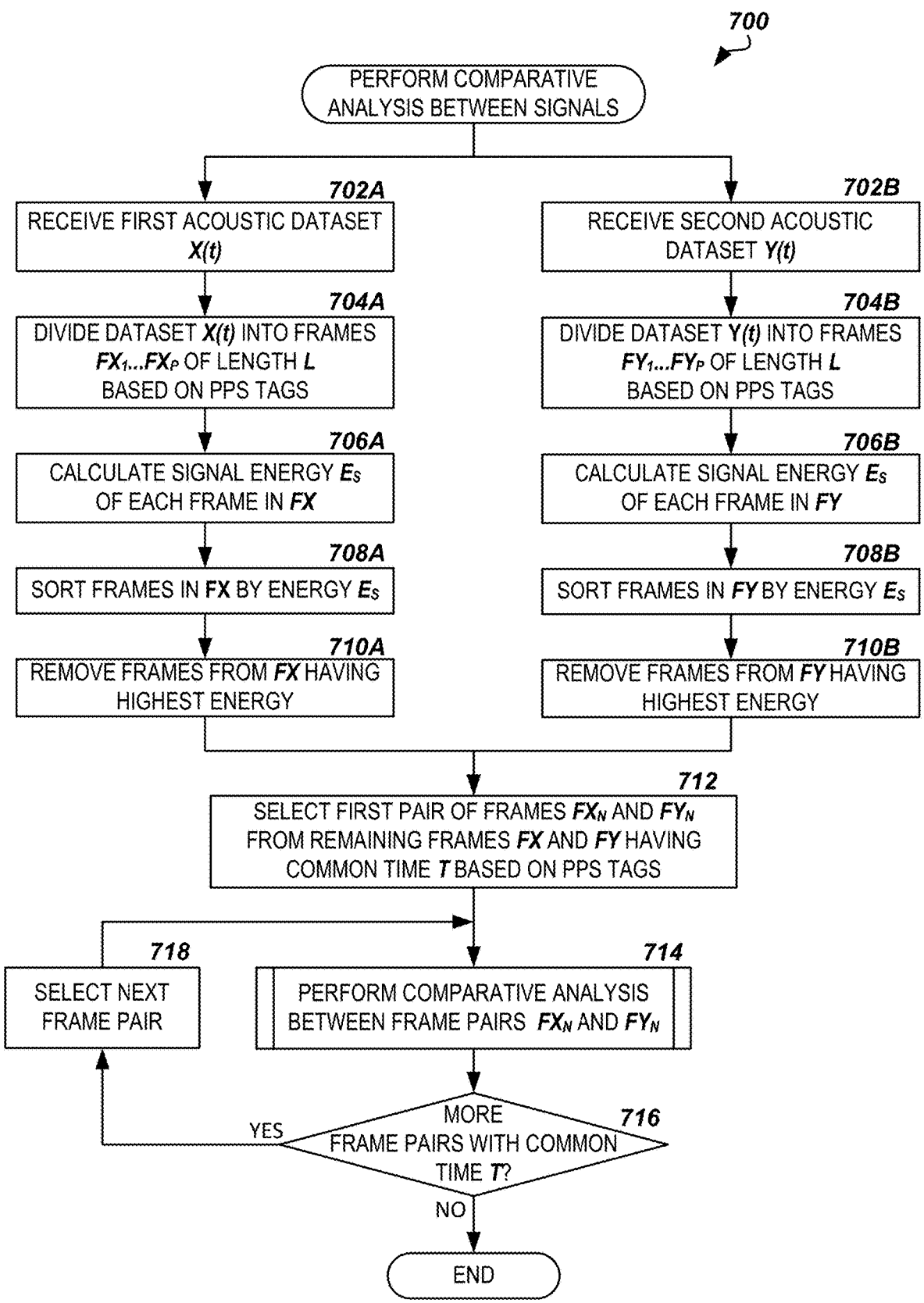
FIG. 7 is a flow diagram showing another routine for time-synchronizing two independent datasets for comparative analysis, according to further embodiments described herein.

FIG. 7 is a flow diagram showing another method for time-synchronizing sample data from independent recording devices utilizing samples tagged from a highly accurate time source, according to further embodiments. The routine 700 depicted in FIG. 7 includes the process of dividing the acoustic datasets 110A and 110B into frames 410 based on the PPS-tagged sample records and pre-processing the frames before performing the comparative analysis between time-synchronized frame pairs. For example, each set of frames may be filtered to exclude those frames containing a higher level of noise (high signal energy) before comparative analysis is performed. According to some embodiments, the routine 700 may be performed by the comparative processing module 322 or other software component running on the analysis computer 112, as described above. In other embodiments, the routine 700 may be performed by any combination of recording devices 108, analysis computers 112, and/or any other computing platforms known in the art.

The routine 700 begins at steps 702A and 702B, where the acoustic datasets 110A and 110B are received from the recording devices 108A and 108B, respectively. According to some embodiments, the structure of the acoustic datasets 110A and 110B may be similar to that described in regard to Tables 1 and 2 above. Next at steps 704A and 704B, the comparative processing module 322 divides each of the acoustic datasets 110A and 110B into respective sets of frames FX and FY based on the PPS-tagged samples 404 within the datasets. In some embodiments, each frame 410 within the framesets FX and FY begins at a PPS-tagged sample 404 and is of length L samples. Each frame 410 is also associated with a time value T corresponding to the PPS-tagged sample record in the respective acoustic datasets 110A, 110B. As described above, some samples 404 in the respective acoustic datasets 110A, 110B may fall within two or more frames 410, while other samples may not fall within any frames, due to variations in the actual sampling frequency of the recording devices 108A and 108B.

Once the acoustic datasets 110A and 110B have been divided into respective framesets FX and FY, the routine proceeds to steps 706A and 706B, where the comparative processing module 322 calculates an overall signal energy $E_S$ for each frame in the framesets FX and FY, according to some embodiments. A high overall signal energy in the frame 410 may indicate an excessive amount of signal noise the acoustic data. For example, the overall signal level $E_S$ of a frame 410 may be calculated for comparison purposes by utilizing the following formula:

$$Es = \sum_{t=1}^{L} \left( x(t) - \frac{1}{L} \sum_{t=1}^{L} x(t) \right)^2$$

It will be appreciated that other algorithms or methods known in the art may be utilized to calculate the overall signal energy $E_S$ for each frame 410.

From steps 706A and 706B, the routine 700 proceeds to steps 708A and 708B, where the comparative processing module 322 then sorts the frames 410 of the respective framesets FX and FY based on the calculated overall signal energy $E_S$ for the frame. The routine 700 then proceeds to steps 710A and 710B, where the comparative processing module 322 removes the frames from the respective framesets FX and FY having the highest overall signal energy. In some embodiments, all frames 410 having a calculated overall signal energy $E_S$ exceeding a predetermined threshold may be removed. The threshold value may be determined based on a level of noise above which the comparative analysis has been found to be unproductive. In further embodiments, a certain percentage, such as 20%, of the frames 410 having the highest calculated overall signal energy may be removed from each frameset.

Next, the routine proceeds to step 712, where the comparative processing module 322 determines a first pair of frames $FX_N$ and $FY_N$ from the remaining frames of the respective framesets FX and FY that are associated with a common time value T. The comparative processing module 322 may then perform comparative analysis between the pair of frames $FX_N$ and $FY_N$, as shown at step 714. The comparative analysis of frames $FX_N$ and $FY_N$ may be performed as described above in regard to FIG. 6, for example. In this way, comparative analysis is performed between frames of time-synchronized samples from the respective acoustic datasets 110A and 110B.

The routine 700 then proceeds to step 716, where the comparative processing module 322 determines if more frame pairs exist for comparative analysis, i.e., additional pairs of frames $FX_N$ and $FY_N$ exist in the respective framesets FX and FY that are associated with a common time value T. If more frame pairs exist, the routine 700 proceeds to step 718, where the comparative processing module selects the next pair of frames $FX_N$ and $FY_N$ for analysis. From step 718, the routine 700 returns to step 714, where comparative analysis of the next pair of frames $FX_N$ and $FY_N$ is performed in an iterative fashion until all pairs of frames $FX_N$ and $FY_N$ in the respective framesets FX and FY that are associated with a common time value T have been analyzed. Once all pairs of frames 410 have been processed, the routine 700 ends.

Based on the foregoing, it will be appreciated that technologies for time-synchronizing sample data from independent recording devices utilizing samples tagged from a highly accurate time source are presented herein. While embodiments are described herein in regard to comparative analysis of recorded acoustic signals for leak detection, those having ordinary skill in the art will recognize that the present disclosure may be utilized in other systems where data representing any type of time-dependent signals received from remote, independent detection or collection devices must be time-synchronized for accurate comparative analysis, including pipe condition assessment systems utilizing an applied sound source, earthquake or tsunami warning systems, video surveillance systems, lightening detection systems, and the like. The above-described embodiments are merely possible examples of implementations, set forth for a clear understanding of the principles of the present disclosure.

The logical operations, functions or steps described herein as part of a method, process or routine may be implemented (1) as a sequence of processor-implemented acts, software modules or portions of code running on a controller or computing system and/or (2) as interconnected machine logic circuits or circuit modules within the controller or computing system. The implementation is a matter of choice dependent on the performance and other requirements of the system. Alternate implementations are included in which operations, functions or steps may not be included or executed at all, may be executed out of order from that shown or discussed, including substantially concurrently or in reverse order, depending on the functionality involved, as would be understood by those reasonably skilled in the art of the present disclosure.

It will be further appreciated that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

Many variations and modifications may be made to the above-described embodiments without departing substantially from the spirit and principles of the present disclosure. Further, the scope of the present disclosure is intended to cover any and all combinations and sub-combinations of all elements, features and aspects discussed above. All such modifications and variations are intended to be included herein within the scope of the present disclosure, and all possible claims to individual aspects or combinations of elements or steps are intended to be supported by the present disclosure.

What is claimed is:

1. A method for time-synchronizing signal data from independent recording devices for comparative analysis comprising steps of:
   recording a plurality of sequential samples representing a signal over a period of time at a first recording device and second recording device, each of the plurality of sequential samples comprising a type field;
   setting the type field for each of the recorded plurality of sequential samples to a first type value if the sample was taken immediately following a rising edge of a pulse in a PPS signal obtained from a highly accurate time source onboard the respective recording device or to a second type value if the sample was not taken immediately following the rising edge of a pulse in the PPS signal;
   receiving a first dataset from the first recording device and a second dataset from the second recording device, each dataset comprising the plurality of sequential samples recorded at the respective recording device, each dataset containing a plurality of samples having the first type value indicating the sample was taken immediately after the rising edge of a pulse in the PPS signal;
   extracting indices of the samples having the first type value along with corresponding time values from the first dataset and the second dataset;
   determining a common time value between the first dataset and the second dataset along with the indices of the corresponding samples having the first type value;
   extracting frames of a specific length from the first dataset and the second dataset aligned on the samples having the first type value corresponding to the common time value; and
   performing comparative analysis between the frames.

2. The method of claim 1, further comprising performing comparative analysis for all pairs of frames aligned to samples having the first type value corresponding to common time values between the first dataset and the second dataset.

3. The method of claim 1, wherein the signals represent acoustic signals taken from acoustic transducers connected to the recording devices.

4. The method of claim 3, wherein the acoustic transducers are located on a fluid pipe and wherein the comparative analysis between the frames yields data for detecting a leak in the fluid pipe.

5. The method of claim 1, wherein the highly accurate time source comprises a GPS receiver.

6. The method of claim 5, wherein the time values in the datasets comprise GPS time messages received from the GPS receivers onboard the recording devices and having a third type value.

7. The method of claim 1, wherein the comparative analysis comprises calculating a signal correlation between the frames.

8. A system for performing comparative analysis between signals recorded at independent recording devices, the system comprising:
   a plurality of recording devices, each recording device comprising an internal clock, a processor, a memory, an analog-to-digital converter (ADC), and a communication modem and being connected to a sensor and a highly accurate time source, the recording devices configured to:
   record digital samples of a signal received from the sensor and digitized by the ADC, add a type field to each of the recorded samples, the type field set to a first type value if the sample was taken immediately following a rising edge of a pulse in a PPS signal from the highly accurate time source or to a second type value if the sample was not taken immediately following the rising edge of a pulse in the PPS signal, collect the samples into a dataset along with time values corresponding to the samples having the type field set to the first type value, and transmit the dataset via the communication modem to an analysis computer; and the analysis computer comprising at least one processor operably connected to a memory, the memory containing a comparative processing module configured to:

receive a first dataset from a first of the plurality of recording devices, receive a second dataset from a second of the plurality recording devices, extract pairs of frames of a specific length from the first dataset and the second dataset aligned on the samples having the type field set to the first type value and corresponding to a common time value, and perform comparative analysis between the pairs of frames.

9. The system of claim 8, wherein the internal clocks of the plurality of recording devices are not synchronized.

10. The system of claim 8, wherein the first of the plurality of recording devices and the second of the plurality of recording devices are further configured to record the digital samples beginning at a same time for a same configured sample size and same configured sampling frequency.

11. The system of claim 10, wherein the specific length of the frames is an even multiple of approximately one second worth of samples at the configured sampling frequency.

12. The system of claim 8, wherein the comparative processing module is further configured to exclude frames having a higher level of overall signal energy from the comparative analysis.

13. The system of claim 8, wherein the highly accurate time source comprises a GPS receiver.

14. The system of claim 8, wherein the communication modem is configured to transmit the dataset from the recording device to the analysis computer over a wireless mesh network.

15. The system of claim 8, wherein the sensor comprises an acoustic transducer and the signal comprise acoustic signals.

16. The system of claim 8, wherein the sensors connected to the first of the plurality of recording devices and the second of the plurality of recording devices are attached to a same pipe, and wherein the comparative analysis between the frames yields data for determining a condition of a wall of the pipe.

17. A non-transitory computer-readable medium having processor-executable instructions stored thereon that, when executed by a processor in a first recording device, cause the processor to:

sample an acoustic signal received from a sensor for a configured amount of time and at a configured sampling frequency;

add a type field to each of the samples, the type field set to a first type value if the sample was taken immediately following a rising edge of a pulse in a PPS signal received from a highly accurate time source or to a second type value if the sample was not taken immediately following the rising edge of a pulse in the PPS signal;

collect the samples into a first dataset along with time values corresponding to the samples having the type field set to the first type value indicating the sample was taken immediately following the rising edge of a pulse in the PPS signal; and transmit the first dataset to a remote analysis computer for comparative analysis with.

18. The non-transitory computer-readable medium of claim 17, wherein the highly accurate time source comprises a GPS receiver.

19. The non-transitory computer-readable medium of claim 17, wherein the sensors connected to the first recording device and the second recording device are attached to a same pipe, and wherein the comparative analysis between the datasets yields data for one or more of detecting a leak in the pipe and determining a condition of a wall of the pipe.

20. The non-transitory computer-readable medium of claim 19, wherein the comparative analysis comprises calculating a signal correlation between frames of data extracted from the samples of the first and second datasets and aligned on samples having the type field set to the first type value and corresponding to a common time value between the first and second datasets.

* * * * *